United States Patent
Bandorick et al.

(10) Patent No.: US 7,081,204 B2
(45) Date of Patent: Jul. 25, 2006

(54) REMEDIATION OF BARIUM, BICARBONATE AND ALKALINITY IN GROUND WATER

(76) Inventors: Bruce W. Bandorick, 377 Cummings Ave., Buffalo, WY (US) 82834; James C. Roberts, 1407 Yorkshire, Casper, WY (US) 82609; Ronald St. John, 7631 Rimrock Dr., Gillette, WY (US) 82716

(*) Notice: Subject to any disclaimer, the term of this patent is extended or adjusted under 35 U.S.C. 154(b) by 189 days.

(21) Appl. No.: 10/830,965

(22) Filed: Apr. 22, 2004

(65) Prior Publication Data

US 2005/0236337 A1    Oct. 27, 2005

(51) Int. Cl.
    C02F 1/42    (2006.01)
    C02F 1/58    (2006.01)
    C02F 1/44    (2006.01)

(52) U.S. Cl. .............. 210/638; 210/639; 210/665; 210/702; 210/724

(58) Field of Classification Search ............... 210/724
See application file for complete search history.

(56) References Cited

U.S. PATENT DOCUMENTS

| | | | | |
|---|---|---|---|---|
| 4,839,054 A | * | 6/1989 | Ruebush et al. | 210/639 |
| 5,234,602 A | * | 8/1993 | Morris et al. | 210/698 |
| 5,501,798 A | * | 3/1996 | Al-Samadi et al. | 210/652 |
| 6,113,797 A | * | 9/2000 | Al-Samadi | 210/652 |
| 6,761,823 B1 | * | 7/2004 | Maddux et al. | 210/615 |

* cited by examiner

*Primary Examiner*—Peter A. Hruskoci
(74) *Attorney, Agent, or Firm*—Cochran Freund & Young LLC; Samuel M. Freund

(57) ABSTRACT

A method for reducing the total concentration of barium in a source of ground water, such that the water can safely be returned to the watershed or used for drinking water, is described. The present method includes extracting the water from a source thereof, and contacting the water with an effective amount of sulfuric acid. The method has the additional benefits that it simultaneously reduces the pH of the water as well as reducing the concentration of bicarbonate ions. An example of water often having total barium concentrations too high for release into the watershed, includes water extracted during coal-bed methane production.

33 Claims, 4 Drawing Sheets

REMEDIATION OF BARIUM, BICARBONATE AND ALKALINITY IN GROUND WATER

FIELD OF THE INVENTION

The present invention relates generally to remediation of wastewater and, more particularly, to the restoration of discharge water to acceptable alkalinity and acceptable levels of barium and bicarbonate.

BACKGROUND OF THE INVENTION

As a bi-product of coal-bed methane production, water having significant concentrations of barium and carbonate ions is often generated. This water has higher than neutral pH as well. In order for such water to be discharged to a watershed for beneficial uses, be suitable as drinking water, or to be used for irrigation, the concentrations of these ions often must be reduced, and the pH lowered. For example, guidelines in the State of Wyoming require total barium concentration in pipe effluents to be $\leq 1800$ μg/L for all water introduced into the watershed. Federal standards require total barium concentration for drinking water to be $\leq 2000$ μg/L.

Water alkalinity and bicarbonate concentration are known to have an impact on aquatic life. Concentrations of total carbonate greater than 2000 μg/L when measured as $CaCO_3$, and as $HCO_3$ can have a negative impact on aquatic life. These constituents also have a negative impact on soils when the water is used for irrigation purposes.

Water pH values between 6.5 and 8.5 are required in order for discharge water to be released into the watershed. High pH can also have a negative impact on soils.

Accordingly, it is an object of the present invention to provide a method for reducing the level of barium ions in discharge water destined to be released into the watershed or destined for drinking purposes.

Another object of the present invention is to provide a method for reducing the level of bicarbonate and carbonate ions in discharge water destined to be released into the watershed, destined for drinking purposes, or used for irrigation purposes.

Still another object of the invention is to provide a method for reducing the pH from any source of alkalinity of discharge water destined to be released into the watershed, used for irrigation, or destined for drinking purposes.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with its purposes of the present invention, as embodied and broadly described herein, the method for reducing the total concentration of barium in a source of ground water hereof includes the steps of extracting the water from the source thereof; and contacting the water with an effective amount of sulfuric acid.

Benefits and advantages of the present invention include, but are not limited to, simultaneously reducing barium ion, bicarbonate ion and pH of groundwater effluent from methane production from coal-bed sources with a single step treatment.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

Briefly, the present invention includes the reduction of barium ion concentration in water recovered from coal-bed methane extraction processes. In what follows, recovered water includes ground water extracted from underground sources or from streams fed by ground water sources. Additional benefits of the present invention include the simultaneous reduction of bicarbonate ion concentration, and the lowering of the pH of the water. Recovered water, after being extracted from its source, is mixed with concentrated sulfuric acid ($H_2SO_4$). Often, the source of the water is below ground. Barium sulfate formed as a result of this procedure can be allowed to precipitate more completely by passing the reacting mixture into a holding tank for a chosen period of time. Coagulants can be utilized to enhance settling and decrease the amount of sulfuric acid used. Filtration can also be employed in lieu of or in combination with a settling tank. It has been found that barium sulfate precipitate can readily be removed in a laboratory environment with a 0.45 μm filter. Typically, the total barium concentration is reduced to 5% of its starting value in a single pass, thereby permitting the water to be introduced into the watershed.

Reasons for isolating the water from its source include reducing the loss of sulfuric acid as a result of reactions thereof with various reactive species found in rocks and sediment which would otherwise react with the sulfuric acid.

The method of the present invention can be used as a pre-treatment for cation exchange and reverse osmosis procedures, since the reduction in barium ion concentration reduces the fouling of cation exchange resins and reverse osmosis membranes.

Having generally described the invention, the following EXAMPLE provides additional detail.

EXAMPLE

Effluent water from a coal-bed methane production process is pumped from an underground source thereof at a rate of approximately 3000 barrels/day (42 gal./barrel) through an approximately 15-foot long, 4 in. inner diameter pipe to which concentrated, commercially available sulfuric acid (93%–98%) is injected through a 1 in. inner diameter hole. Clearly, lower concentrations of sulfuric acid can be utilized by adjusting the amount of sulfuric acid solution used to achieve the desired reduction in barium ions and bicarbonate ions, and the desired final pH. Additionally, other mixing arrangements may be utilized. The concentration of barium (ions and total barium) was measured in the raw water before injection, and as effluent from a horizontal settling tank that has approximately 160 bbls (6700 gal.) of storage into which the treated water is introduced and allowed to remain for a chosen period.

Figure 1:
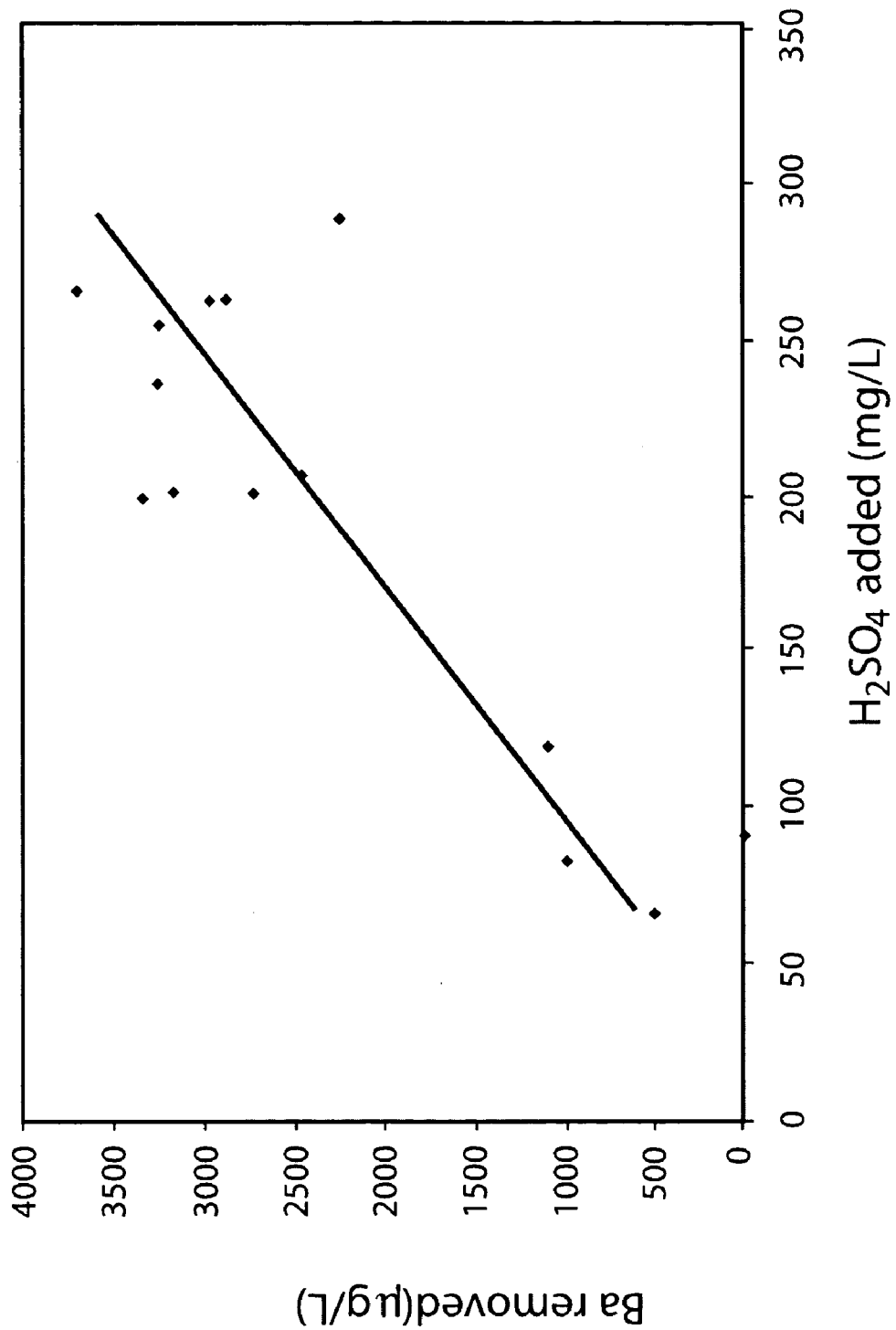
FIG. 1 is a graph of the barium concentration in water treated with sulfuric acid in accordance with the teachings of the present claimed invention, as a function of acid dosage which takes into account a range of flow rates suitable for a typical Coal Bed Methane production location.

Reference will now be made in detail to the present embodiments of the invention, examples of which are illustrated in the accompanying drawings. Turning now to FIG. 1 hereof, shown is a graph of the total barium concentration in water as a function of acid concentration, for water treated with sulfuric acid in accordance with the teachings of the present claimed invention for the range of flows encountered. It may be observed from FIG. 1 and the data set forth in the TABLE that the total barium concentration at the outlet of the holding tank decreases with increasing sulfuric acid concentration.

Figure 2:
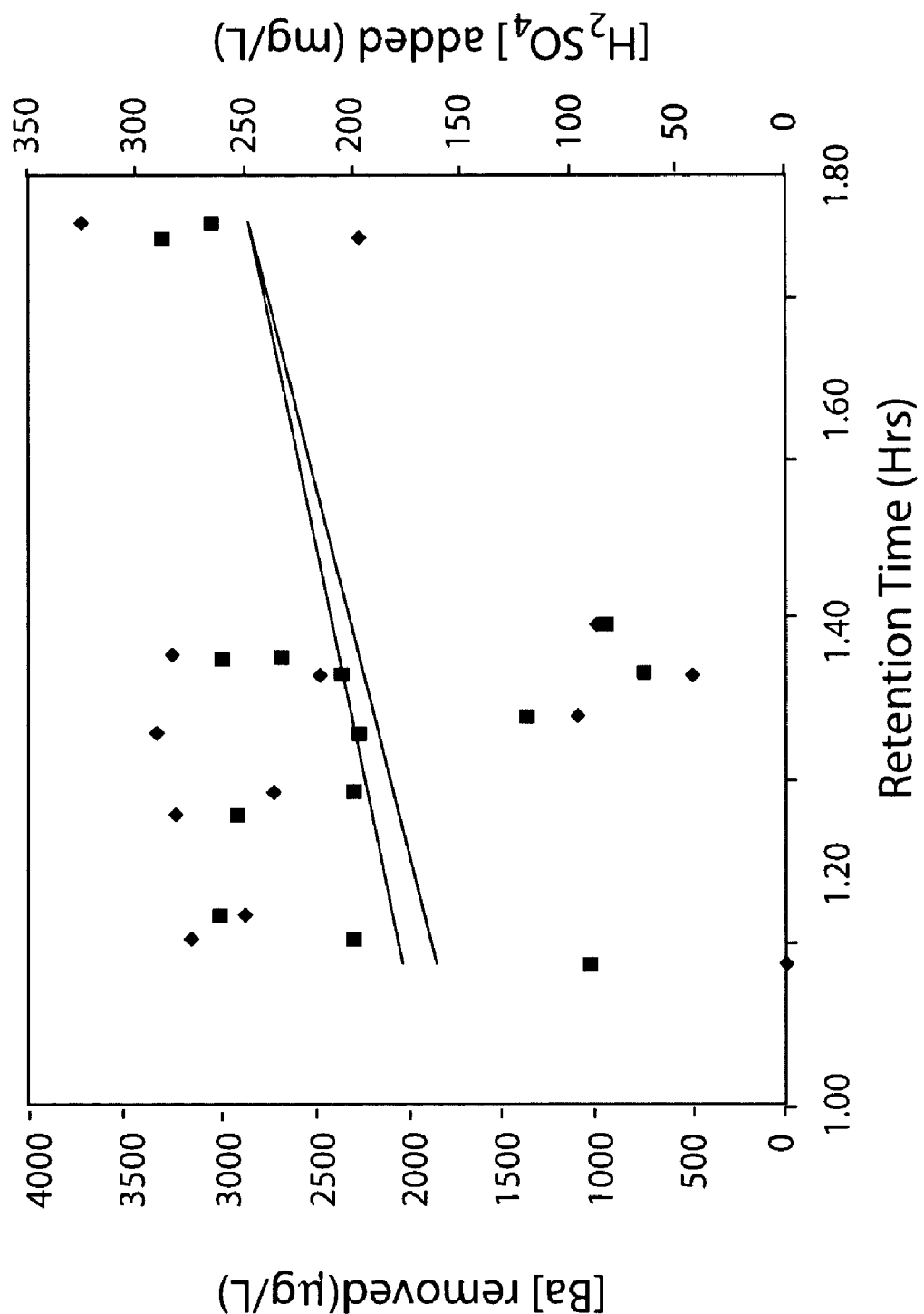
FIG. 2 is a graph of the outlet total barium concentration, and the sulfuric acid dosage, as a function of holding tank retention time, for the range of flows present at a typical Coal Bed Methane production location.

FIG. 2 is a graph of the outlet total barium concentration and sulfuric acid concentration, as a function of holding tank retention time, for the range of water flow rates encountered. The dark diamonds and line denote the barium removed, while the gray squares and line denotes the added sulfuric acid. The graph shows a direct correlation between the sulfuric acid concentration and the amount of barium removal, but that the retention time does not strongly correlate with the amount of barium removal. From other data, precipitate settling rate appears to be dependent on the sulfuric acid concentration, with precipitates formed using lower sulfuric acid concentrations experiencing less efficient settling.

portional to the reduction of bicarbonate ions, and specific data points are provided in the TABLE.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for reducing the total concentration of barium in a source of ground water which comprises the steps of: extracting the ground water from the source thereof, wherein the ground water is generated as a bi-product of coal-bed methane production; contacting the extracted water with an effective amount of sulfuric acid to precipitate barium sulfate, and reducing the concentration of barium in said ground water by settling or filtering the barium sulfate precipitate.

2. The method of claim 1, wherein the sulfuric acid is concentrated sulfuric acid.

3. The method of claim 2, wherein the concentrated sulfuric acid contains greater than 93% sulfuric acid.

4. The method of claim 1, further comprising the step of allowing the water to stand for a chosen period of time after said step of contacting the water with sulfuric acid.

5. The method of claim 1, wherein the total barium concentration in the water is reduced to below 1800 µg/L.

6. The method of claim 1, wherein the pH of the water is maintained between 6.5 and 8.5 after said step of contacting the water with sulfuric acid.

TABLE

| Flow Rate (bbl/day) | Acid Injection Rate (L/day) | [H$_2$SO$_4$] (mg/L) | [Ba] Inlet Total (µg/L) | [Ba] Outlet Total (µg/L) | Retention Time (h) | pH (inlet) | pH (outlet) | [HCO$_3$] (inlet) (mg/L) | [HCO$_3$] (outlet) (mg/L) |
|---|---|---|---|---|---|---|---|---|---|
|  | 37 |  | 3300 | 2700 |  | 7.1 | 6.9 |  |  |
|  | 55 |  | 2900 | 240 |  | 7.0 | 6.9 |  |  |
| 2782 | 53 | 200 | 2900 | 180 | 1.27 | 7.1 | 7.0 |  |  |
| 3572 | 68 | 201 | 3300 | 140 | 1.14 | 7.1 | 6.6 |  |  |
| 3048 | 68 | 235 | 3400 | 150 | 1.39 | 7.1 | 6.8 |  |  |
| 2820 | 68 | 254 | 3400 | 150 | 1.25 | 6.9 | 6.5 |  |  |
| 2890 | 72 | 262 | 3000 | 130 | 1.16 | 7.1 | 6.6 | 1190 | 898 |
| 2632 | 72 | 288 | 3000 | 750 | 1.74 | 7.0 | 6.5 |  |  |
| 2895 | 72 | 261 | 3200 | 230 | 1.38 | 7.1 | 6.9 | 1280 | 921 |
| 2002 | 23 | 119 | 3500 | 2400 | 1.33 | 6.8 | 6.7 |  |  |
| 3609 | 23 | 66 | 3400 | 2900 | 1.37 | 6.8 | 6.8 | 1280 | 1180 |
| 2638 | 23 | 91 | 2900 | 2900 | 1.12 | 6.8 | 6.7 |  |  |
| 2895 | 23 | 83 | 3100 | 2100 | 1.41 | 6.9 | 6.8 |  |  |
| 2895 | 57 | 206 | 3400 | 940 | 1.37 | 7.0 | 6.8 | 1270 | 951 |
| 2256 | 57 | 265 | 3900 | 190 | 1.76 | 7.1 | 6.7 | 1330 | 953 |
| 3008 | 57 | 199 | 3500 | 170 | 1.32 | 7.0 | 6.7 | 1280 | 942 |

Figure 3:
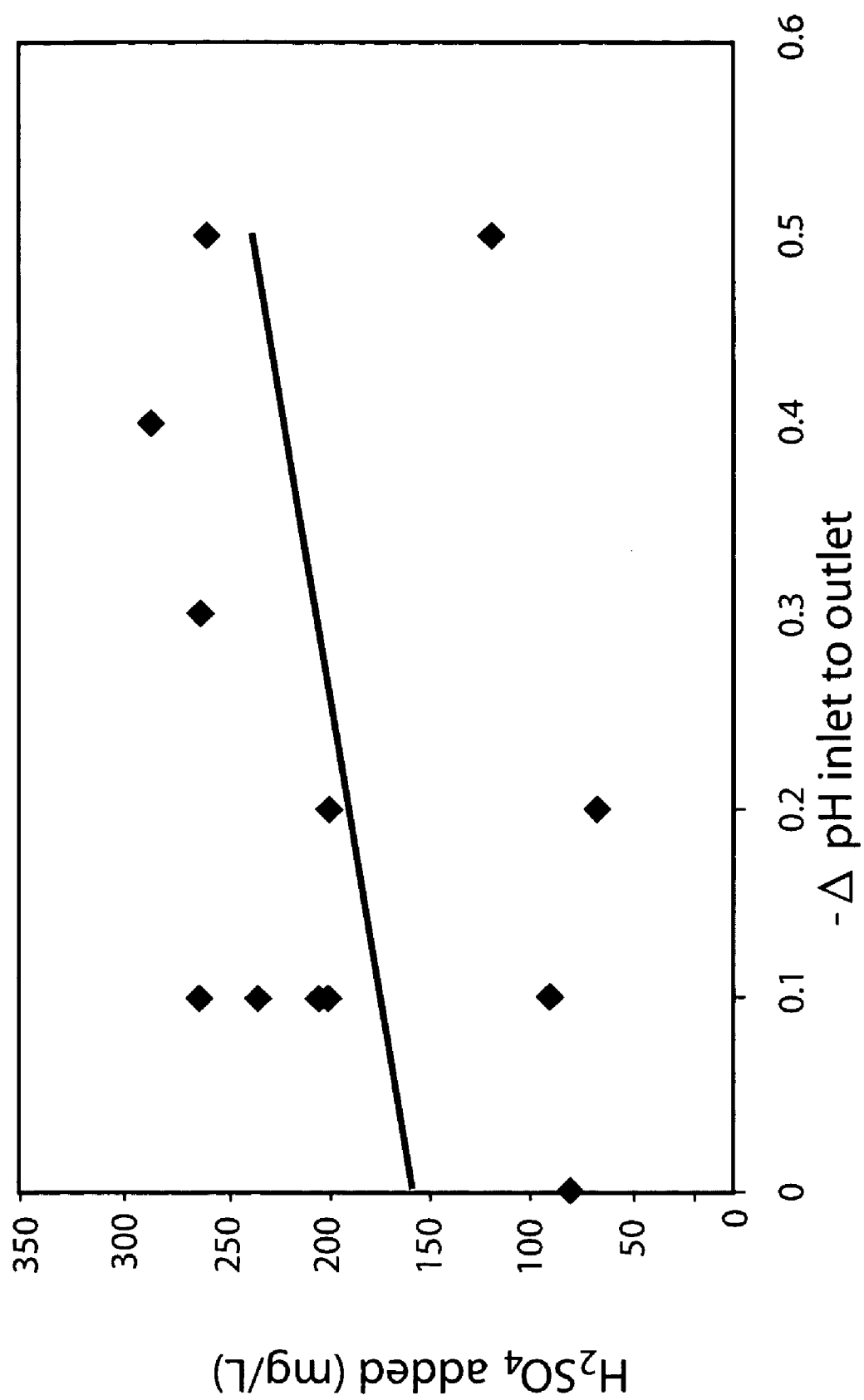
FIG. 3 is a graph of the change in pH of water treated with sulfuric acid as a function of acid dosage.

FIG. 3 is a graph of the change in pH of water treated with sulfuric acid as a function of acid concentration. Current pH requirements for water released to the watershed are between 6.5 and 8.5. The specific data points are provided in the TABLE.

Figure 4:
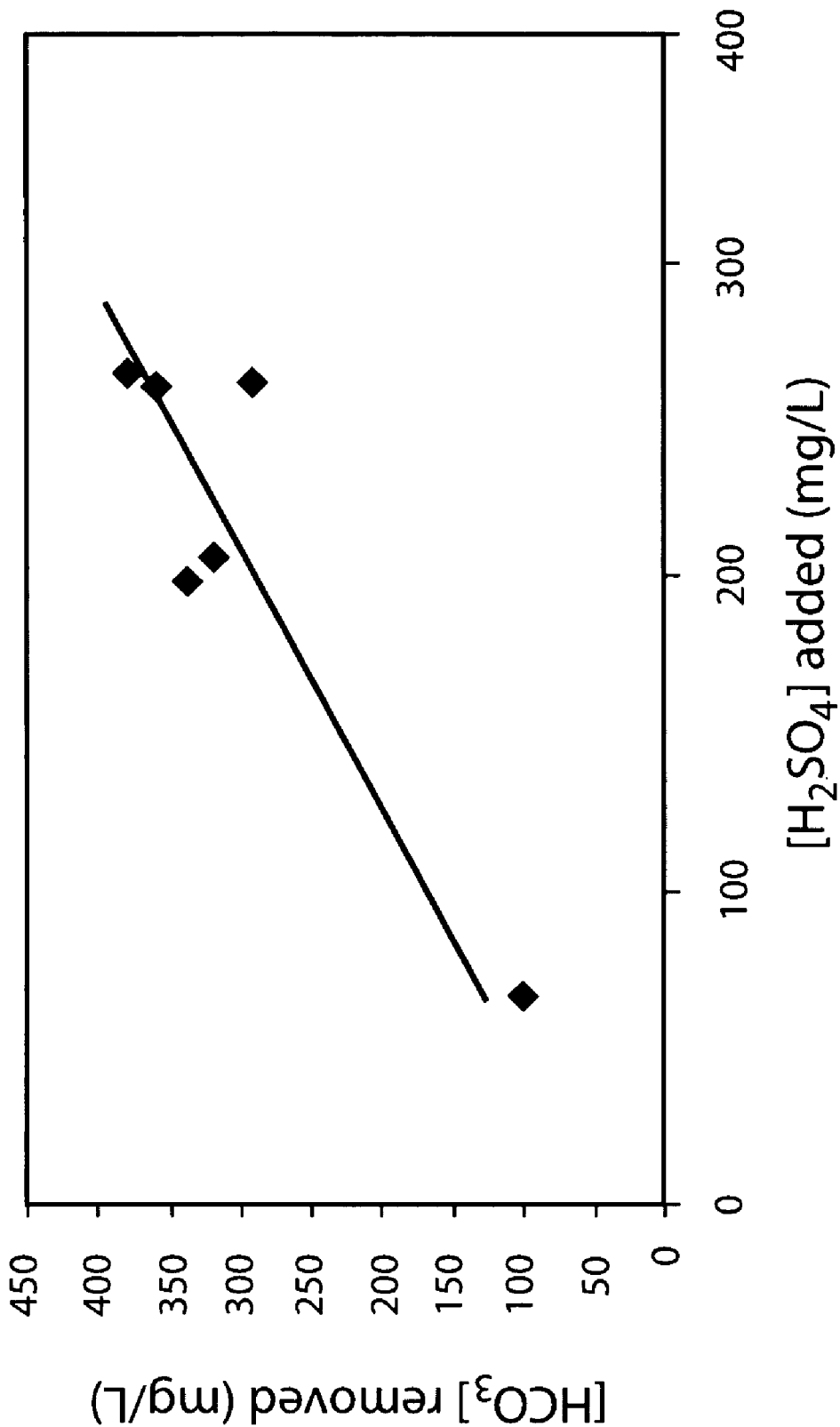
FIG. 4 is a graph of the change in bicarbonate concentration as a function of sulfuric acid dosage.

FIG. 4 is a graph of the change in bicarbonate concentration as a function of the acid concentration for a full-scale pilot procedure. The reduction in alkalinity is directly pro- 7. The method of claim 6, wherein the pH of the water is between 6.5 and 7.0 after said step of contacting the water with sulfuric acid.

8. The method of claim 1, wherein said step of contacting the water with sulfuric acid is achieved by mixing the sulfuric acid with water flowing in a pipe.

9. The method of claim 8, wherein the concentration of sulfuric acid is between 60 mg/L and 300 mg/L.

10. The method of claim 1, further including the step of filtering the water after said step of contacting the extracted water with an effective amount of sulfuric acid.

11. The method of claim 1, wherein said method is used as a pretreatment for water undergoing further purification using methods selected from the group consisting of cation exchange and reverse osmosis.

12. A method for reducing the total barium concentration, the concentration of bicarbonate ions and for reducing the pH of a source of ground water, which comprises the steps of extracting the water from the source thereof, wherein the ground water is generated as a bi-product of coal-bed methane production; contacting the extracted water with an effective amount of sulfuric acid to precipitate barium sulfate, and reducing the concentration of barium in said ground water by settling or filtering the barium sulfate precipitate.

13. The method of claim 12, wherein the sulfuric acid is concentrated sulfuric acid.

14. The method of claim 13, wherein the concentrated sulfuric acid contains greater than 93% sulfuric acid.

15. The method of claim 12, further comprising the step of allowing the water to stand for a chosen period of time after said step of contacting the water with sulfuric acid.

16. The method of claim 12, wherein the barium ion concentration in the water is reduced to below 1800 μg/L.

17. The method of claim 12, wherein the pH of the water is maintained between 6.5 and 8.5 after said step of contacting the water with sulfuric acid.

18. The method of claim 17, wherein the pH of the water is between 6.5 and 7.0 after said step of contacting the water with sulfuric acid.

19. The method of claim 12, wherein said step of contacting the water with sulfuric acid is achieved by mixing the sulfuric acid with water flowing in a pipe.

20. The method of claim 19, wherein the concentration of sulfuric acid is between 60 and 300 mg/L.

21. The method of claim 12, further including the step of filtering the water after said step of contacting the extracted water with an effective amount of sulfuric acid.

22. The method of claim 12, wherein said method is used as a pretreatment for water undergoing further purification using methods selected from the group consisting of cation exchange and reverse osmosis.

23. A method for reducing the concentration of barium ions in a source of ground water which comprises the steps of: extracting the ground water from the source thereof, wherein the ground water is generated as a bi-product of coal-bed methane production; contacting the extracted water with an effective amount of sulfuric acid to precipitate barium sulfate, and reducing the concentration of barium in saidground water by settling or filtering the barium sulfate precipitate.

24. The method of claim 23, wherein the sulfuric acid is concentrated sulfuric acid.

25. The method of claim 24, wherein the concentrated sulfuric acid contains greater than 93% sulfuric acid.

26. The method of claim 23, further comprising the step of allowing the water to stand for a chosen period of time after said step of contacting the extracted water with sulfuric acid.

27. The method of claim 23, wherein the total barium concentration in the water is reduced to below 1800 μg/L.

28. The method of claim 23, wherein the pH of the water is maintained between 6.5 and 8.5 after said step of contacting the water with sulfuric acid.

29. The method of claim 28, wherein the pH of the water is between 6.5 and 7.0 after said step of contacting the water with sulfuric acid.

30. The method of claim 23, wherein said step of contacting the water with sulfuric acid is achieved by mixing the sulfuric acid with water flowing in a pipe.

31. The method of claim 30, wherein the concentration of sulfuric acid is between 60 and 300 mg/L.

32. The method of claim 23, further including the step of filtering the water after said step of contacting the extracted water with an effective amount of sulfuric acid.

33. The method of claim 23, wherein said method is used as a pretreatment for water undergoing further purification using methods selected from the group consisting of cation exchange and reverse osmosis.

* * * * *